United States Patent [19]

Hatsukano et al.

[11] 3,851,185

[45] Nov. 26, 1974

[54] BLANKING CIRCUIT

[75] Inventors: Yoshikazu Hatsukano; Kosei Nomiya; Hiroto Kawagoe, all of Tokyo, Japan

[73] Assignee: Hitachi, Ltd., Tokyo, Japan

[22] Filed: Dec. 29, 1972

[21] Appl. No.: 319,444

[30] Foreign Application Priority Data

Dec. 29, 1971 Japan .................................. 46-3476

[52] U.S. Cl. ................. 307/205, 307/217, 307/251, 307/304, 340/324 R

[51] Int. Cl. ....................... H03k 19/08, H03k 19/20

[58] Field of Search ........ 307/205, 221 C, 251, 279, 307/304, 214, 217, 215; 340/324, 339

[56] References Cited

UNITED STATES PATENTS

| | | | |
|---|---|---|---|
| 3,523,284 | 8/1970 | Washizuka | 307/221 C |
| 3,651,342 | 3/1972 | Dingwall | 307/251 |
| 3,720,841 | 3/1973 | Suzuki | 307/221 C |
| 3,737,673 | 6/1973 | Suzuki | 307/214 X |

*Primary Examiner*—Rudolph V. Rolinec
*Assistant Examiner*—L. N. Anagnos
*Attorney, Agent, or Firm*—Craig & Antonelli

[57] ABSTRACT

A blanking circuit wherein, in dependence on whether means to control an output by the inverted signal of a blanking signal is provided or not, the output level of said blanking circuit can be easily altered.

11 Claims, 12 Drawing Figures

FIG. 4
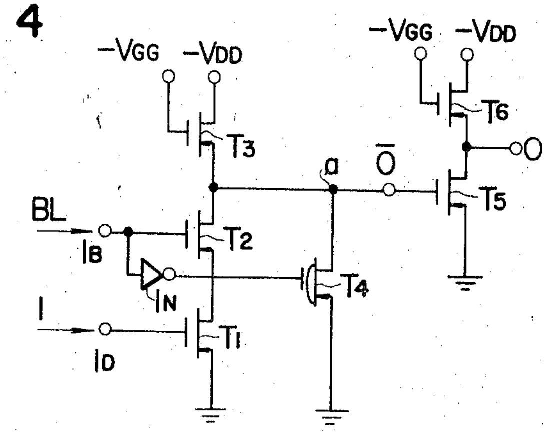
FIG. 5
| | I | BL | Ō | O |
|---|---|---|---|---|
| (a) | H | L | L | H |
| | H | H | L | H |
| | L | L | H | L |
| | L | H | L | H |
| (b) | L | L | H | L |
| | L | H | H | L |
| | H | L | L | H |
| | H | H | H | L |
FIG. 6
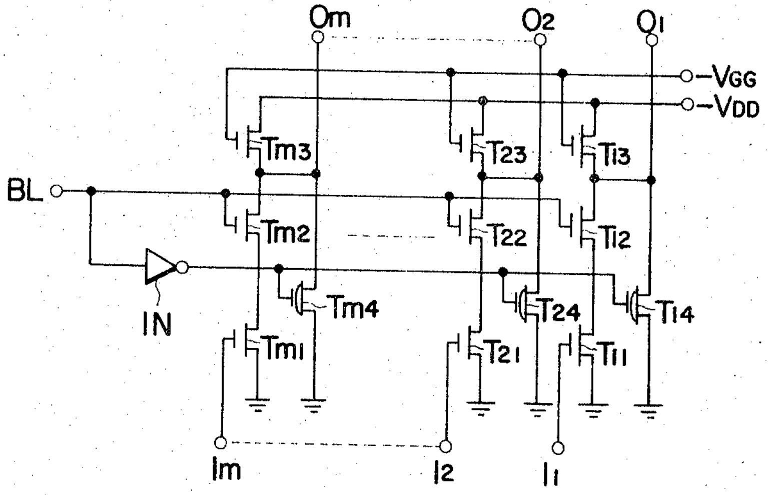

BLANKING CIRCUIT

The present invention relates to a blanking circuit for use in a digital circuit of an electronic calculator.

A principal object of the present invention is to provide a novel blanking circuit.

Another object of the present invention is to provide a blanking circuit whose output level can be easily altered.

The invention will be described hereunder in connection with the preferred embodiments thereof, reference being had to the accompanying drawings, in which:

FIGS. 3(a–g) are time charts for explaining a blanking signal;

FIG. 4 shows an embodiment of the blanking circuit according to the present invention;

FIG. 5 is a truth table of the blanking circuit in FIG. 4; and

FIG. 6 shows a specific example in which the embodiment in FIG. 4 is applied to a dynamic display system.

Figures 1, 3A, 3B, 3C, 3D, 3E, 3F, 3G:
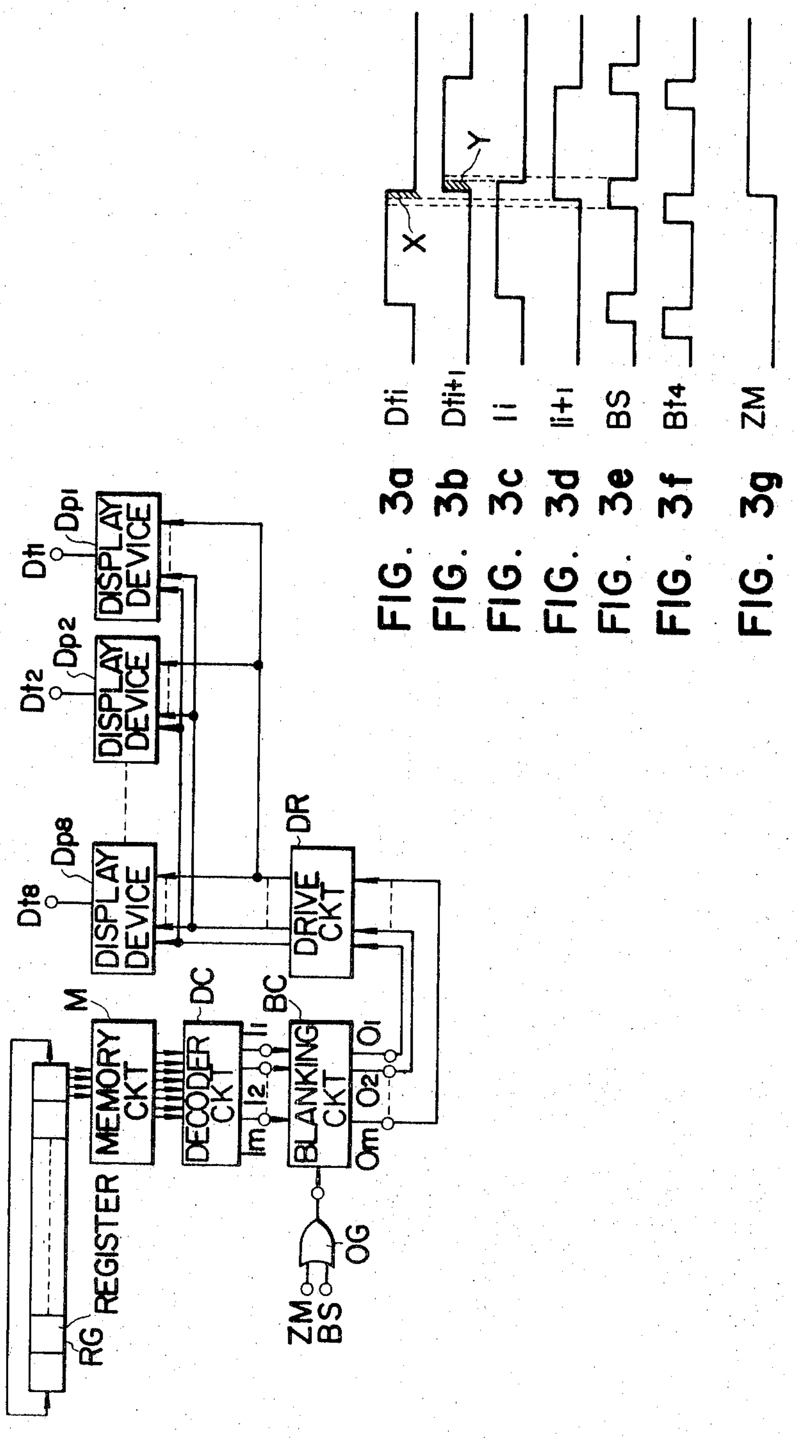
FIG. 1 is a block diagram showing a dynamic display system in which a blanking circuit according to the present invention is utilized.

Referring to FIG. 1, the block diagram illustrates a dynamic display system in an electronic portable calculator which comprises a blanking circuit BC according to the present invention. RG designates a register for display, in which binary-coded decimal signals, for example, are circulated to be stored therein. M indicates a memory circuit, in which the binary-coded decimal signals derived from the register RG for each digit are stored in parallel. Shown at DC is a decoder circuit, which decodes the binary-coded signals stored in the memory circuit M and converts them into signals for lighting up or writing predetermined characters or numerals.

BC represents the blanking circuit as stated above, to which the display signals are supplied as input signals after the decoding by the decoder circuit DC, and blanking signals BL are also supplied as control signals of the display signals. $I_1$ – $I_m$ and $O_1$ – $O_m$ designate input and output terminals of the blanking circuit BC, respectively. A drive circuit DR serves to drive display devices $Dp_1$ – $Dp_8$, which are respectively at the first-eighth digits. The display signals are supplied from the drive circuit to the display devices $Dp_1$ – $Dp_8$. Digit changing signals $Dt_1$ - $Dt_8$ for lighting up the display devices in a time sharing manner are also supplied thereto.

Figure 2:
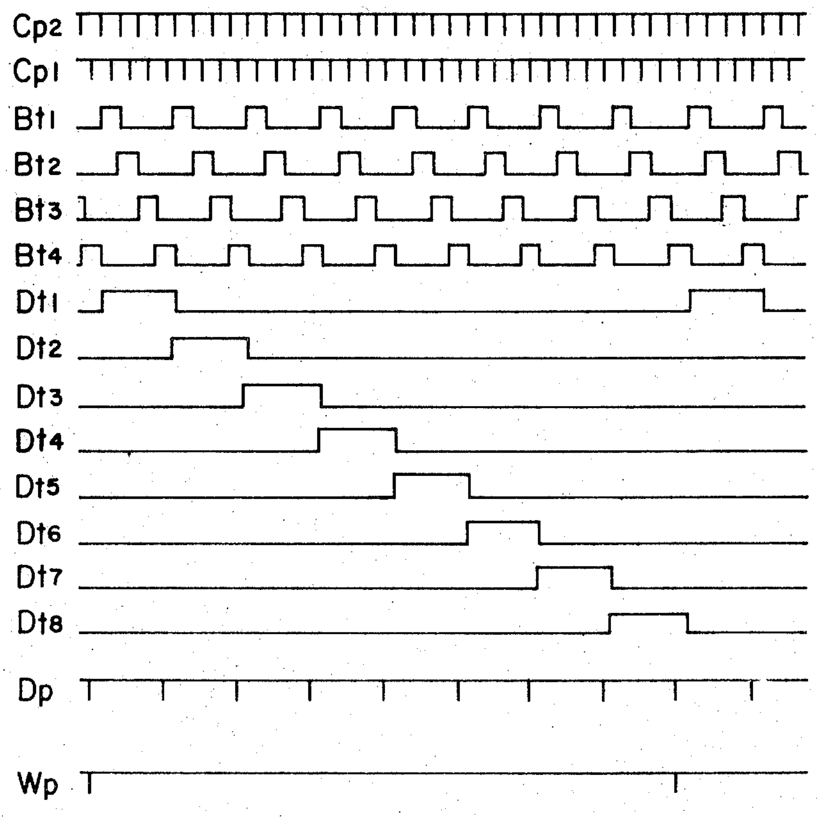
FIG. 2 is a time chart showing various pulse signals which are used in, for example, the dynamic display system in FIG. 1.

Referring now to FIGS. 2 and 3, description will be made of various timing pulse and blanking signals which are used in the foregoing dynamic display system, the electronic portable calculator to which the system is applied, and so forth. In the figures, the upper level of a pulse signal indicates a reference potential or the ground potential (logic 1), while the lower level represents a negative potential (logic 0). Clock pulses $Cp_1$ and $Cp_2$ are generated by, e.g., astable multivibrators, and form the time base by themselves in the calculator. They are used for the drive or shift of, e.g., memory elements (delay type flip-flop circuits) connected in cascade within the shift register RG. Bit signals $Bt_1$ – $_Bt_4$ are used in case of, e.g., converting the binary parallel signals derived from the encoder into series binary signals. Digit signals $Dt_1$ – $Dt_8$ are used as, e.g., the digit changing signals in the dynamic display system. Digit pulses $Dp$ distinguish the digits of a binary-coded decimal number, and are used for control of the writing of the memory circuit M in the embodiment. Word pulses $Wp$ are used for distinguishing words. The characteristic equations of the respective pulses $Dp$ and $Wp$ are represented by:

$$Dp = \overline{Bt_4 \cdot \overline{Cp_1}} \text{ and } Wp = \overline{Bt_4 \cdot \overline{Cp_1} \cdot Dt_8}$$

which can be composed of the foregoing pulses. The bit signals $Bt_1$ – $Bt_4$ and the digit signals $Dt_1$ – $Dt_8$ can be respectively generated from the clock pulses $Cp_2$ and the bit signal $Bt_1$ by making use of, e.g., counters. Herein, the pulse width of the bit signals $Bt_1$ – $Bt_4$ corresponds to the period of the clock pulses $Cp_1$ or $Cp_2$, and to the time of 1 bit of the series binary signal. The pulse width of the digit signals $Dt_1$ – $Dt_8$ and the period of the digit pulses Dp correspond to the period of the bit signals $Bt_1$ – $Bt_4$, namely, the time of 1 digit (4 bits) of the series binary-coded decimal number. The period of the word pulses $Wp$ corresponds to the period of the digit signals $Dt_1$ – $Dt_8$.

In FIGS. 3(a) to 3(g), $Dt_i$ and $Dt_{i+1}$ indicate digit changing signals at the $i$-th and $(i+1)$-th digits, respectively, while $I_i$ and $I_{i+1}$ represent display signals at the $i$-th and $(i+1)$-th digits, respectively. Now, in the case where the display signal $I_i$ at the $i$-th digit lags over the digit changing signal $Dt_i$ at the $i$-th digit, the $i$-th digit display signal $I_i$ is displayed not only in the $i$-th digit display device but also in the $(i+1)$-th digit display device by the digit changing signal at the next digit or the $(i+1)$-th digit, as is illustrated by an oblique line portion Y in FIG. 3(b). This becomes a cause for flickering of the display device. In the case where the digit changing signal $Dt_{i+1}$ at the $(i+1)$-th digit lags over the display signal $I_{i+1}$ at the $(i+1)$-th digit, the display signal $I_{i+1}$ to be displayed in the $(i+1)$-th digit display device $Dp_{i+1}$ is also displayed in the $i$-th digit display device by the digit changing signal $Dt_i$ at the $i$-th digit, as is illustrated by an oblique line portion X in FIG. 3(a). Similarly, this becomes a cause for flickering of the display device.

In order to prevent the flickering of the display device as is thus induced by the asynchronism between the digit changing signal and the display signal, a blanking signal BS illustrated in FIG. 3(e) is used. The blanking signal BS is one with the phase of the foregoing bit signal $Bt_4$ retarded by ½ bit by the use of the clock pulses $Cp_1$. The blanking circuit as will be stated below in more detail, is constructed so that the flickering of the display devices as illustrated by the oblique line portions X and Y may be eliminated by the blanking signal BS.

A signal ZM illustrated in FIG. 3(g) is a blanking signal for zero mask. It is used for the following reason. In case where the number 1234 is displayed in a display unit of, for example, 8 digits in the electronic portable calculator, it is usually indicated as 00001234 in the display unit. Herein, the display of 0 at the higher 4 digits is not only unnecessary, but also it makes the indication difficult to read. Besides, as the portable calculators are made small in size, a battery or the like is being employed for a power source section. In order to extend the life of the battery, it is extremely important that power consumption in the display section be made low by doing away with the display of the unnecessary 0 at the higher digits.

The blanking signal ZM is used for the purpose of preventing such unnecessary higher-digit 0's from being displayed. The blanking signal ZM in FIG. 3(g) corresponds to the case where the highest digit having the number, e.g., 1 – 9 is the $i$-th digit, that is, where the unnecessary 0's at higher digits are located at the $(i+1)$-th to eighth digits. The characteristic equation of the blanking signal ZM in this case is expressed by $ZM = Dt_{i+1} + Dt_{i+2} + \ldots + Dt_8$. Such blanking signals BS and ZM are applied to an OR circuit OG as illustrated in FIG. 1 and are fed as the blanking signal BL into the blanking circuit BC. Herein, the blanking signal BL is expressed by $BL = ZM + BS$.

Referring back to FIG. 1 again, the display signals transmitted from the decoder circuit DC are blocked at suitable times by means of the blanking circuit to which the blanking signal BL is supplied. Thus, the display is prevented. Herein, as to the output level of the blanking circuit BC for extinguishing the display devices $Dp_1 - Dp_8$, different values are required in dependence on the specification of the display devices $Dp_1 - Dp_n$ and the construction of the drive circuit DR. Accordingly, if the constructions of the display devices and the drive circuit are altered, alteration of the blanking circuit BC is unavoidable. For this reason, it is considered to add one inverter stage to the blanking circuit BC or the drive circuit DR. However, in case of constructing these circuits as an integrated semiconductor circuit, the layout of semiconductor elements to be assembled therein and other factors need be largely altered. Therefore, the period of time from a request for manufacture of the integrated circuit till completion thereof becomes long.

A circuit arrangement by which the output level of the blanking circuit can be easily altered is shown in FIG. 4. The figure illustrates the fundamental construction of the blanking circuit according to the present invention, wherein $I_D$ designates an input terminal to which a display signal I from, e.g., the decoder circuit DC is supplied, while $I_B$ indicates an input terminal to which the blanking signal BL is supplied. A field effect transistor $T_1$ has its input (gate) electrode connected to the input terminal $I_D$, and one of the output electrodes (source electrode) grounded. A transistor $T_2$ has the gate electrode connected to the input terminal $I_B$, and one of the output electrodes (source electrode) connected to the other output electrode (drain electrode) of the transistor $T_1$. A load resistance transistor $T_3$ has the input electrode connected to a power source $-V_{GG}$, one of the output electrodes (source electrode) connected to the other output electrode (drain electrode) of the transistor $T_2$, and the other output electrode (drain electrode) connected to a power source $-V_{DD}$. A transistor $T_5$ has the input electrode connected to the drain electrode of the transistor $T_2$, and one of the output electrodes (source electrode) grounded. A transistor $T_6$ has the input electrode connected to the power source $-V_{GG}$, one of the output electrodes (source electrode) connected to the other output electrode (drain electrode) of the transistor $T_5$, and the other output electrode (drain electrode) connected to the power source $-V_{DD}$. An output terminal $\overline{O}$ is connected to the drain electrode of the transistor $T_2$. A transistor $T_4$ has one of the output electrodes (source electrode) grounded, and the other output electrode (drain electrode) connected to the output terminal $\overline{O}$. An inverter $I_N$ has its input side connected to the input terminal $I_B$, and its output side connected to the input electrode of the transistor $T_4$. An output terminal O is connected to the drain electrode of the transistor $T_5$. The transistors $T_5$ and $T_6$ merely constitute an inverter, and the terminal $\overline{O}$ or O can be selected, as is necessary, as the output terminal of the blanking circuit.

The transistor $T_4$ is provided with a gate electrode, a source electrode and a drain electrode. In the case where the transistors, including the transistor $T_4$, the wire connections thereof and so forth are produced in the form of an integrated semiconductor circuit, the transistor $T_4$ is adapted to have the thickness of a gate insulating film set arbitrarily unlike the other transistors. Concretely, the following means is adopted.

1. A source-drain region is formed using a well-known diffusion technique.

2. A thick insulating film lying on the surface of a semiconductor substrate between the sources and drains of the transistors $T_1 - T_3$ (a thick insulating film on a gate region) is made thin by etching. At this time, similarly to those of the transistors $T_1 - T_3$, the source-drain region of the transistor $T_4$ is previously formed by diffusion. The thick insulating film on the gate region of the transistor $T_4$ is either left as it is, or thinned by the etching simultaneously with that of the transistors $T_1 - T_3$.

In consequence, the transistors having had the gate insulating film thinned are low in threshold voltage and hence operate as such, whereas the transistor of the thick gate insulating film is high in threshold voltage and hence it does not operate as such even if a predetermined operating voltage is applied to the gate electrode. That is to say, the transistors $T_1 - T_3$ are produced so as to operate as transistors. On the other hand, the transistor $T_4$ is produced so that, whether or not it is operated as a transistor may be determined by a pattern at the etching of the gate insulating film.

Since alterability is given to the thickness of the gate insulating film of the transistor $T_4$ in this way, a symbol as shown in FIG. 4 is employed for the transistor $T_4$ for convenience sake.

The operation of the blanking circuit illustrated in FIG. 4 will now be explained with reference to a truth table in FIG. 5 relating to the respective cases where the transistor $T_4$ operates as such and where it does not. In the truth table in FIG. 5, H and L indicate a high level (ground potential) and a low level (negative potential), respectively. Columns (a) and (b) indicate the cases where the tansistor $T_4$ does not operate and where it does, respectively. The state of the blanking signal BL when the blanking is applied, namely, when the display unit is extinguished, is assumed to be the level H.

1. In case where the gate insulating film of the transistor $T_4$ is thick (where the operation as a transistor is not effected), the transistor T is always in the non-conductive state. The output potential $\overline{O}$ therefore becomes H only when the input signal I is L and the blanking signal BL is L. Accordingly, when the blanking is applied to the input signal I, namely, when the blanking signal BL is H, the output signal $\overline{O}$ of the blanking circuit becomes L. When the blanking is not applied, namely, when the blanking signal BL is L, the output signal $\overline{O}$ becomes equal to the inverted signal $\overline{I}$ of the input signal I (the output signal O becomes equal to the input signal I). 2. In the case where the gate insulating film of the transistor $T_4$ is thin (where the operation as a transistor is effected), the potential L is applied to the gate electrode of the transistor $T_4$ by the inverter IN when the blanking is applied. Therefore, the transistor $T_4$ is rendered conductive, and the output signal $\overline{O}$ becomes H conversely to the case (1). When the blanking is not applied, the transistor $T_4$ becomes non-conductive, and the output signal $\overline{O}$ becomes equal to the inverted signal $\overline{I}$ of the input signal.

Accordingly, in case where the output signal $\overline{O}$ of the blanking circuit when the display unit is to be extinguished is desired to be at the low level, the gate insulating film may be made thick, while in case where the same is desired to be at the high level, the gate insulating film may be made thin. For an alteration between both the requests, the alteration of the blanking circuit is easily accomplished by merely selecting a pattern at the etching of the gate insulating film. In the case where the foregoing display signal is applied to the blanking circuit as the input signal, the alteration of the display unit or the drive circuit necessitates, not only a change in the foregoing condition of the transistor $T_4$ of the blanking circuit, but also inversion of the display signal in attendance thereon. The inversion of the display signal can be easily accomplished by altering the pattern of an ROM (read only memory) which constitutes the decoder DC.

To determine whether the transistor $T_4$ is operated as such or not, does not exclusively rely on the method of altering the thickness of the gate insulating film. It can also be accomplished in such a way that the source and drain regions, the source, drain and gate electrodes, and the gate insulating film being thin enough to operate the transistor are formed beforehand, and that a wiring or interconnection pattern is altered. For example, in the case of operating the transistor $T_4$ as such, the gate electrode may be connected to the inverter $I_N$, while in the case where operation as a transistor is not effected, the gate electrode may be grounded. It is also possible to apply the blanking signal BL to the gate electrode of the transistor $T_1$, to apply the input signal I to the gate electrode of the transistor $T_2$ and to connect the inverter $I_N$ to the gate electrode of the transistor $T_1$, thereby to change for each other the positions to which the blanking signal BL and the input signal I are applied.

FIG. 6 illustrates a case where the blanking circuit shown in FIG. 4 is utilized in a dynamic display system. In FIG. 6, the same parts as in FIG. 1 are indicated by the same symbols.

Referring to the figure, the display signals $I_1 - I_m$ transmitted from the decoder DC are respectively applied to the gate electrodes of transistors $T_{11} - T_{m1}$. The blanking signal BL is commonly applied to the gate electrodes of transistors $T_{12} - T_{m2}$. The inverted signal of the blanking signal BL is commonly connected to the gate electrodes of transistors $T_{14} - T_{m4}$. The transistors $T_{14} - T_{m4}$ correspond to the transistor $T_4$ in FIG. 4.

As described above, in accordance with the present invention, the output level of a blanking circuit can be easily changed by a slight alteration of the interior. The blanking circuit according to the present invention is very effective for a display circuit of an electronic calculator, etc.

What is claimed is:

1. A blanking circuit comprising a plurality of field effect transistors connected in series between ground and a load connected to a power source, an inverter circuit having an input connected to the gate electrode of one of said plurality of field effect transistors, means to apply an input signal to the gate electrode of a field effect transistor other than said one field effect transistor, means to apply a blanking signal to said gate electrode of said one field effect transistor, means to obtain an output from said load, and an additional field effect transistor connected between the drain electrode of said one field effect transistor and ground, the gate electrode of said additional field effect transistor being connected to the output of said inverter circuit, whereby the level of that part of said output signal which is determined by said blanking signal can be altered.

2. A blanking circuit comprising:

a plurality of output terminals;

a plurality of sets of loads connected between a power source line and said output terminals, respectively;

a plurality of sets of series connected field effect transistors connected between ground and said output terminals, respectively;

means to connect the gate electrode of one field effect transistor in common with the gate electrodes of the corresponding transistors of the other sets;

an inverter circuit having an input connected to the gate electrode of one field effect transistor;

means to apply input signals to the gate electrode of another field effect transistor connected in series with said one field effect transistor, and the gate electrodes of the corresponding field effect transistors of the other sets, respectively; and means to apply a blanking signal to said gate electrode of said one field effect transistor;

wherein a plurality of additional field effect transistors are connected between ground and said output terminals, respectively, the gate electrodes of said additional field effect transistors being connected in common to the output of said inverter circuit.

3. A blanking circuit as defined in claim 2 wherein said loads each comprise a further field effect transistor.

4. A blanking circuit formed in the form of a semiconductor integrated circuit comprising:

a first and a second field effect transistor connected in series between ground and a load connected to a power source;

means for applying an input signal to the gate electrode of the first field effect transistor;

means for applying a blanking signal to the gate electrode of said second field effect transistor;

an output terminal connected to said load; and selective means including an inverter circuit having an input connected to the gate of said second field effect transistor, and an additional field effect transistor which has its drain electrode connected to said output terminal, and its source electrode connected to ground, said additional field effect transistor being formed so as to be in the non-conductive state continuously in one condition and so as to have the gate electrode connected to the output of said inverter circuit in another condition.

5. A blanking circuit as defined in claim 4 wherein said load is provided in the form of a further field effect transistor having its source electrode connected to the drain electrode of said second field effect transistor and its gate and drain electrodes connected to respective voltage levels of said power source.

6. A blanking circuit formed in the form of a semiconductor integrated circuit comprising:

a first and a second field effect transistor connected in series between ground and a load connected to a power source;

means for applying an input signal to the gate electrode of the first field effect transistor;

means for applying a blanking signal to the gate electrode of said second field effect transistor;

an output terminal connected to said load;

an inverter circuit having an input connected to the gate electrode of said second field effect transistor; and an additional field effect transistor having its drain electrode connected to said output terminal and its source electrode connected to ground by substantially zero impedance means, and having its gate electrode connected to an output of said inverter circuit.

7. A blanking circuit as defined in claim 6 wherein said load is provided in the form of a further field effect transistor having its source electrode connected to the drain electrode of said second field effect transistor and its gate and drain electrodes connected to respective voltage levels of said power source.

8. A blanking circuit as defined in claim 7 further comprising an additional inverter circuit having its input connected to said output terminal.

9. A blanking circuit as defined in claim 8 wherein said additional inverter circuit is formed by a pair of series connected field effect transistors connected between ground and said power source.

10. An integrated circuit comprising:

an output line;

a power source line;

a ground line;

a first and a second insulated gate field effect transistor connected in series with each other and each having a relatively thin gate insulator and a gate electrode formed on the insulator, the series connected first and second transistors being connected between said output line and the ground line;

a third insulated gate field effect transistor having a relatively thick gate insulator and a gate electrode formed on the insulator, the third transistor being connected between the output line and the ground line;

a load connected between the power source line and the output line; and an inverter circuit having an input connected to the gate electrode of said first transistor and an output connected to the gate electrode of said third transistor.

11. An integrated circuit comprising:

an output line;

a ground line;

a first, a second and a third insulated gate field effect transistor, said first and second transistors being connected in series between said output and ground lines, said third transistor being arranged between said output and ground lines;

an inverter circuit having an input connected to the gate of the first transistor;

and means for inactivating said third transistor whereby avoiding the third transistor from operating in accordance with an output of the inverter circuit.

* * * * *